US008982230B2

(12) United States Patent
Toyoda

(10) Patent No.: US 8,982,230 B2
(45) Date of Patent: Mar. 17, 2015

(54) IMAGE PICKUP APPARATUS INCLUDING IMAGE ADJUSTMENT PROCESSING FOR IMPROVING AN APPEARANCE OF AN IMAGE, THE IMAGE ADJUSTMENT PROCESSING TO BE APPLIED WHEN IT IS DETERMINED THAT AN IMAGING SCENE IS FINALIZED

(75) Inventor: Tetsuya Toyoda, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 579 days.

(21) Appl. No.: 13/339,809

(22) Filed: Dec. 29, 2011

(65) Prior Publication Data

US 2012/0182440 A1    Jul. 19, 2012

(30) Foreign Application Priority Data

Jan. 17, 2011   (JP) ................................. 2011-007211

(51) Int. Cl.
*H04N 5/228* (2006.01)
*H04N 5/232* (2006.01)

(52) U.S. Cl.
CPC ..................................... *H04N 5/232* (2013.01)
USPC ...................................................... 348/222.1

(58) Field of Classification Search
None
See application file for complete search history.

(56) References Cited

U.S. PATENT DOCUMENTS 7,948,526 B2 * 5/2011 Onoda et al. ............... 348/222.1
8,681,237 B2 * 3/2014 Battles et al. .............. 348/222.1
8,736,703 B2 * 5/2014 Iwamoto et al. ............ 348/222.1
2008/0036870 A1 * 2/2008 Uezono ....................... 348/222.1
2010/0195874 A1   8/2010 Isogai
2011/0129151 A1 * 6/2011 Saito et al. ..................... 382/181

FOREIGN PATENT DOCUMENTS

| CN | 101494738 A | 7/2009 |
| CN | 101815227 | 8/2010 |
| CN | 101895684 | 11/2010 |
| JP | 2002-369142 | 12/2002 |
| JP | 2007-184887 | 7/2007 |
| WO | WO 2009/013850 | 1/2009 |

OTHER PUBLICATIONS

Office Action from corresponding Chinese Patent Application Serial No. 201210012758.8, mailed Jan. 10, 2014 (9 pgs.) with English translation (15 pgs.).
Office Action from corresponding Japanese Patent Application Serial No. 2011-007211, mailed Oct. 28, 2014 (3 pgs.) with English translation (4 pgs.).

* cited by examiner

*Primary Examiner* — Luong T Nguyen
(74) *Attorney, Agent, or Firm* — John C. Pokotylo; Straub & Pokotylo

(57) ABSTRACT

An image pickup apparatus includes an image pickup unit, a scene finalization determination unit, and an image adjustment processing unit. The image pickup unit captures a subject image in photographing operation and obtains image data according to the subject. The scene finalization determination unit determines whether an imaging scene is finalized by a photographer. The image adjustment processing unit applies image adjustment processing according to the imaging scene that is finalized to the image data if the scene finalization determination unit determines that the imaging scene is finalized.

6 Claims, 7 Drawing Sheets

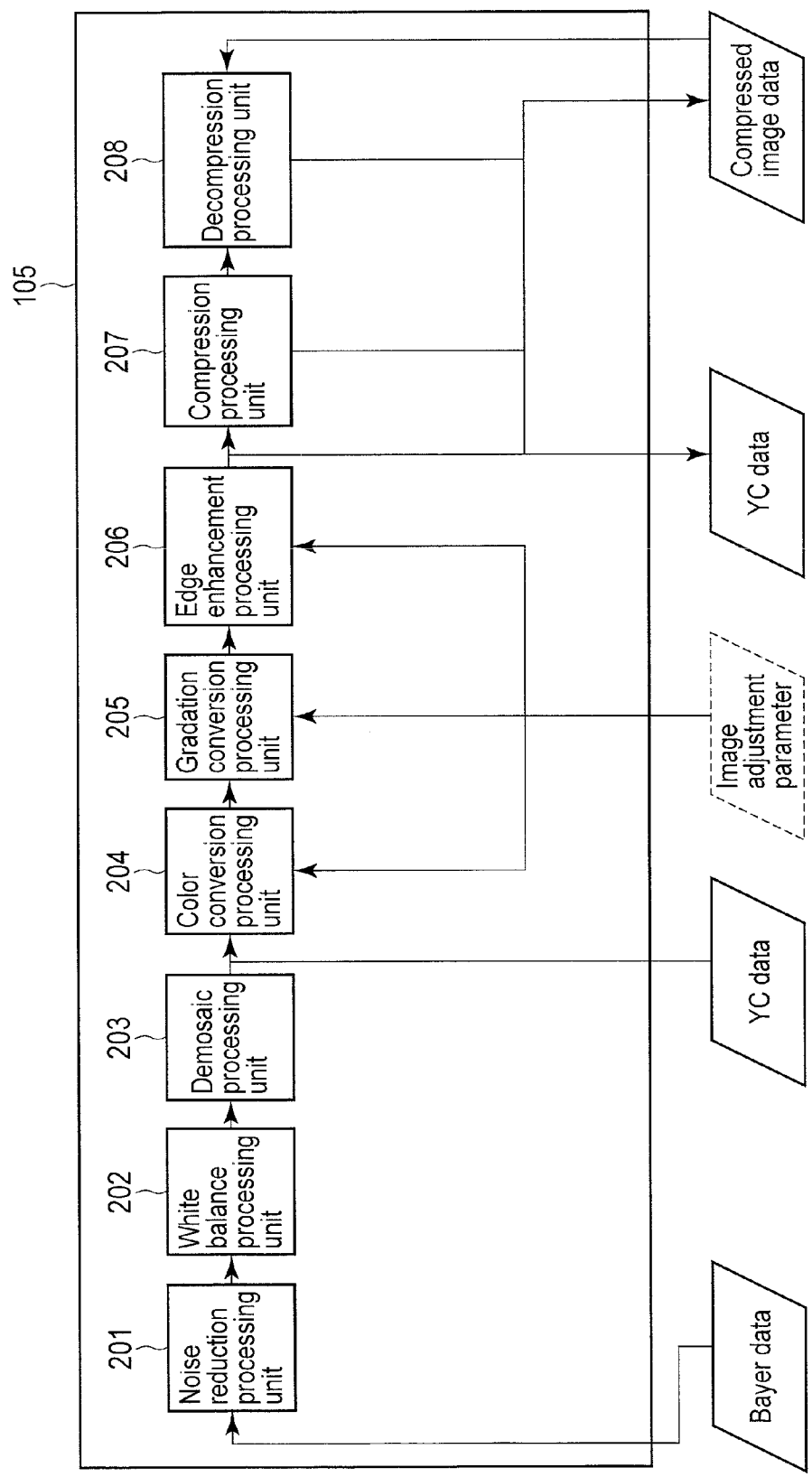
F I G. 3

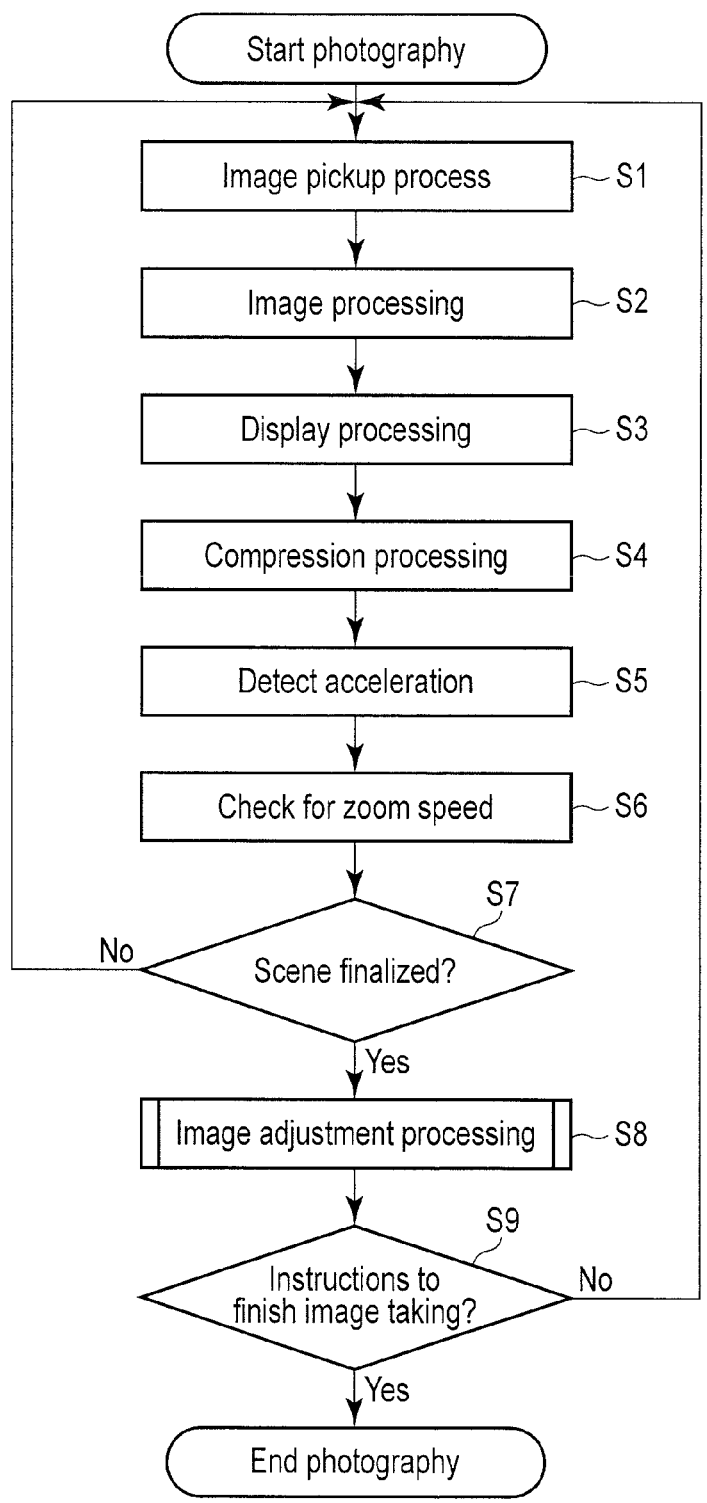
F I G. 4

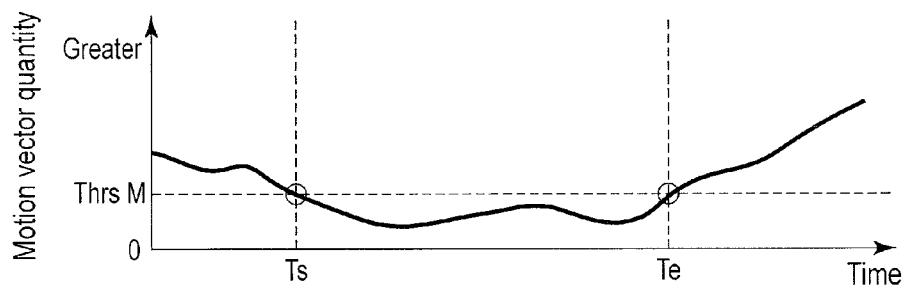
F I G. 5
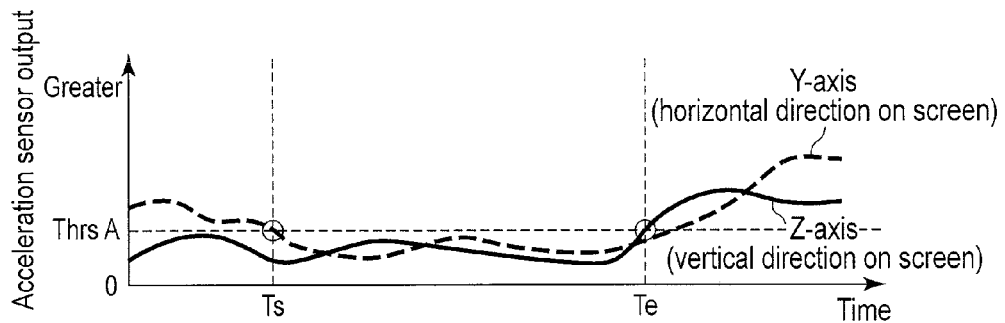
F I G. 6A
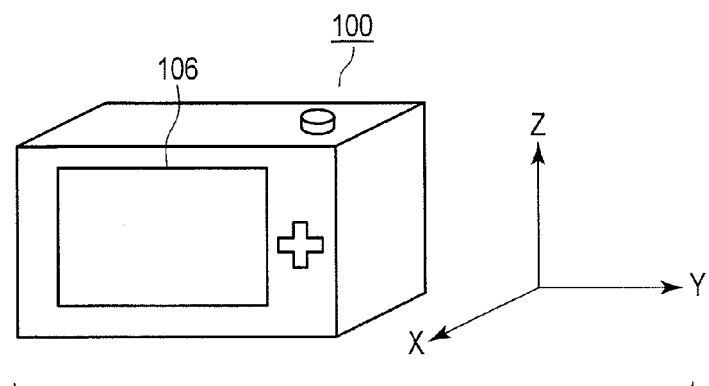
F I G. 6B

US 8,982,230 B2

IMAGE PICKUP APPARATUS INCLUDING IMAGE ADJUSTMENT PROCESSING FOR IMPROVING AN APPEARANCE OF AN IMAGE, THE IMAGE ADJUSTMENT PROCESSING TO BE APPLIED WHEN IT IS DETERMINED THAT AN IMAGING SCENE IS FINALIZED

CROSS-REFERENCE TO RELATED APPLICATIONS

This application is based upon and claims the benefit of priority from prior Japanese Patent Application No. 2011-007211, filed Jan. 17, 2011, the entire contents of which are incorporated herein by reference.

BACKGROUND OF THE INVENTION

1. Field of the Invention

The present invention relates to an image pickup apparatus including an image adjustment processing function for improving an appearance of an image.

2. Description of the Related Art

There is known a technique in which image data resulting from photographing operation is analyzed, and various types of image adjustment processing are performed on the analyzed image data to improve an appearance of an image. Specifically, there is known a technique in which a luminance histogram, a hue, and a saturation of image data, a type of a subject, and the like are analyzed, and contrast or a color tone of an image is adjusted according to a result of the analysis. In addition, there is known a technique in which a main subject is determined from image data or photographing information used when the image data is obtained, and contrast or a color tone of the main subject thus determined is selectively adjusted. Further, Japanese Patent Application laid-open as No. 2007-184887 proposes a technique for determining an intention of a photographer for photography from photographing conditions during the photographing operation and performing image adjustment processing according to a result of the determination.

BRIEF SUMMARY OF THE INVENTION

According to an aspect of the invention, there is provided an image pickup apparatus comprising: an image pickup unit configured to capture an image of a subject in photographing operation and obtain image data according to the subject; a scene finalization determination unit configured to determine whether an imaging scene is finalized by a photographer in the photographing operation; and an image adjustment processing unit configured to apply image adjustment processing according to the imaging scene that is finalized to the image data obtained by the image pickup unit if the scene finalization determination unit determines that the imaging scene is finalized.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram illustrating an internal configuration of an image processing circuit;

FIG. 4 is a flowchart illustrating a procedure of a photographing sequence;

FIG. 5 is a diagram illustrating an example of how finalization of an imaging scene is determined using a motion vector quantity as a first imaging scene finalization determination;

FIG. 6A is a diagram illustrating an example of how finalization of an imaging scene is determined using an output of an acceleration sensor as the first imaging scene finalization determination;

FIG. 6B is a diagram illustrating a relation between a posture of a camera and a direction of a detection axis of the acceleration sensor;

DETAILED DESCRIPTION OF THE INVENTION

Hereinafter, embodiments of the present invention will be described with reference to the drawings.

Figure 1:
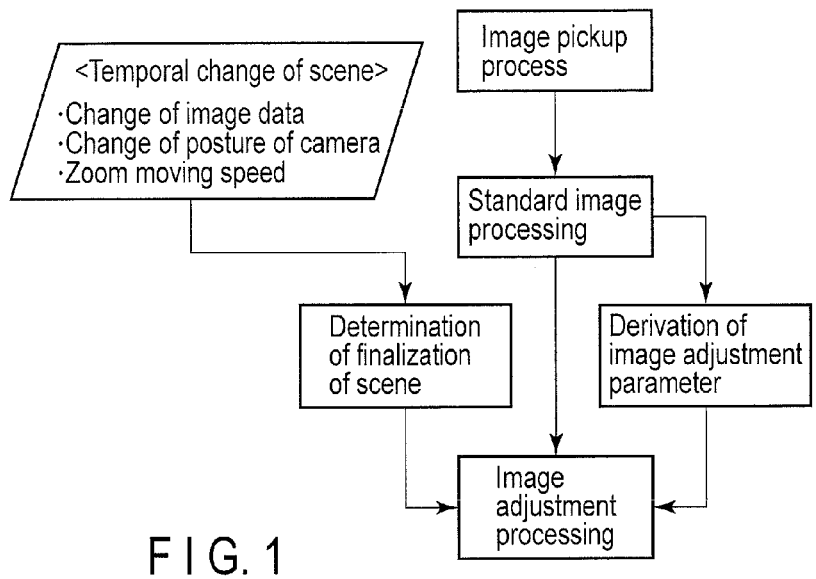
FIG. 1 is diagram illustrating a concept of operation of a digital camera taken as an example of an image pickup apparatus according to an embodiment of the present invention.

FIG. 1 is diagram illustrating a concept of operation of a digital camera (hereinafter, referred to as a "camera") taken as an example of an image pickup apparatus according to an embodiment of the present invention.

An image pickup process is performed upon receiving instructions by a photographer. In the image pickup process, a subject image is picked up. An analog image signal obtained by the image pickup process is subjected to signal processing such as correlated double sampling (CDS) processing, automatic gain control (AGC) processing, or analog-to-digital conversion processing. Through the signal processing, image data as digital data according to the subject image is generated.

Various types of standard image processing are applied to the image data generated through the image pickup process. The standard image processing means performing various types of image processing such as noise reduction processing, white balance processing, demosaic processing, color conversion processing, gradation conversion processing, or edge enhancement processing by using a standard image adjustment parameter that is predetermined for each camera or that is derived from a condition independent of an imaging scene.

An imaging scene finalization determination is made after performing the standard image processing. The imaging scene finalization determination is a process that determines whether an imaging scene is finalized by a photographer. Here, a state in that "an imaging scene is finalized by a photographer" refers to a state in which the photographer holds a camera at the ready for photography or moves the camera for photography. In other words, this state refers to a state in which the photographer has determined how the subject to be photographed is composed. In this embodiment, whether or not the imaging scene is finalized is determined by a presence or absence of a temporal change of the imaging scene. To be specific, it is determined that the imaging scene is finalized in the case where the temporal change in the imaging scene is almost none. In contrast, in the case the imaging scene changes in time, it is determined that either the imaging scene has not been finalized or the imaging scene has been changed from the imaging scene that was finalized to another imaging scene. For example, a method for determining is based on (1) a temporal change of image data, (2) a temporal change of a posture of a camera, and (3) a temporal change of a field angle. These will be described in detail later.

When it is determined that the imaging scene is finalized, an image adjustment parameter according to the imaging scene thus finalized is derived. The image adjustment parameter may include, for example, a parameter for adjusting an image contrast, brightness, saturation, and hue. This type of image adjustment parameter can be derived according to the conventionally well known method. For example, an imaging scene is determined by analyzing image data to which standard image processing is applied, and the image adjustment parameter according to the determined imaging scene is derived. For example, if the main subject is a scene of a sunset, the image adjustment parameter for correcting the saturation, contrast, or the like is derived so that red color of the sunset is intensified. In addition, for example, if the main subject is a scene of the sky, the image adjustment parameter for intensifying blue color of the sky is derived.

When the image adjustment parameter according to the imaging scene is derived, image processing (image adjustment processing) is applied again, using the image adjustment parameter thus derived, to the image data that has undergone the standard image processing. The image adjustment process is a process of adjusting the contrast, brightness, saturation, and hue of the image data according to the imaging scene.

Derivation of the image adjustment parameter and the image adjustment processing are repeatedly performed while the imaging scene is finalized. If the finalized imaging scene changes to another imaging scene, the image adjustment processing that has been performed is halted.

In this way, according to the image pickup apparatus according to this embodiment, when the imaging scene is finalized by the photographer, the image adjustment processing according to the finalized imaging scene is performed. Accordingly, it is possible to automatically perform image adjustment processing by reflecting the intention of the photographer.

Figure 2:
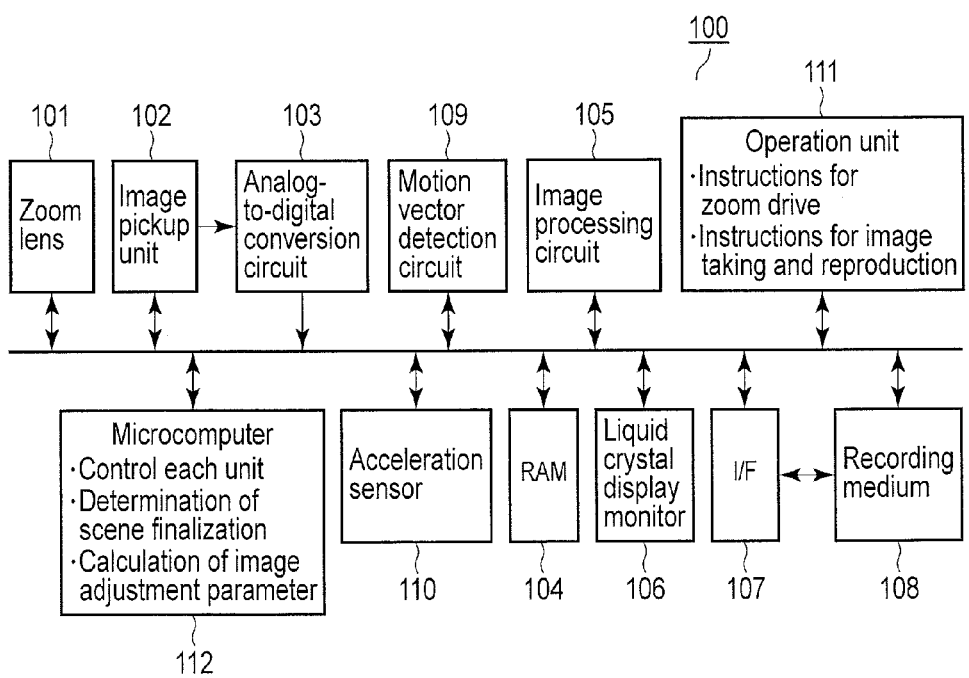
FIG. 2 is a block diagram illustrating a specific configuration of the camera illustrated in FIG. 1.

Hereinafter, the camera according to this embodiment will be more specifically described. FIG. 2 is a block diagram illustrating a specific configuration of the camera illustrated in FIG. 1. As illustrated in FIG. 2, a camera 100 includes a zoom lens 101, an image pickup unit 102, and analog-to-digital conversion circuit 103, a RAM 104, an image processing circuit 105, a liquid crystal display monitor 106, an interface 107, a recording medium 108, a motion vector detection circuit 109, an acceleration sensor 110, an operation unit 111, and a microcomputer 112.

As an example of a field angle change unit, the zoom lens 101 is a lens whose focal length is variable and focuses an image of a subject on an image pickup element included in the image pickup unit 102. The zoom lens 101 is driven in an axial direction thereof according to control by the microcomputer 112. The field angle is changed by driving the zoom lens 101.

The image pickup unit 102 includes the image pickup element and analog signal processing circuit. The image pickup element has a photoelectric conversion surface for receiving light of the subject image focused by the zoom lens 101. The photoelectric conversion surface has pixels individually formed of photoelectric conversion elements (for example, photodiodes) that convert light into a charge and are laid in two-dimensional shape. Further, a color filter having a Bayer pattern is disposed on the photoelectric conversion surface. This image pickup element converts light focused by the zoom lens 101 into an electric signal (image signal). The image pickup element is controlled by the microcomputer 112. In addition, the analog signal processing circuit performs various types of analog signal processing on the image signal input from the image pickup element. For example, the CDS processing is a process for removing a dark-current noise component in the image signal. The AGC processing is an amplification process for arranging a dynamic range of the image signal into a desired range.

The analog-to-digital conversion circuit 103 converts the image signal fed out from the image pickup unit 102 into image data as digital data. Here, if the color filter layout of the image pickup element is in the Bayer pattern, the image data is arranged into a format corresponding to the Bayer pattern. Hereinafter, image data corresponding to the Bayer patter will be referred to as Bayer data.

The RAM 104 is a storage unit that temporarily stores therein the Bayer data as the image data obtained in the analog-to-digital conversion circuit 103, various pieces of data processed by the image processing circuit 105, and the like. The image processing circuit 105 performs various types of image processing on the image data stored in the RAM 104. The image processing circuit 105 will be described later in detail.

The liquid crystal display monitor 106 is provided, for example, on a rear surface of the camera 100, and displays various images such as the images based on the image data processed in the image processing circuit 105. The interface 107 is an interface that is used for mediating data communications with the recording medium 108 by the microcomputer 112. The recording medium 108 stores therein image files obtained as a result of photographing operation.

The motion vector detection circuit 109 detects a motion vector corresponding to image data of each of frames from a plurality of pieces of image data of frames that are obtained in a time sequence through the image pickup unit 102. The motion vector is detected by, for example, the well known block matching method. The block matching method is a method in which image data of each frame is divided into a plurality of pieces of block data, and a deviation of the divided data between frames is obtained by, for example, a correlation calculation. The deviation is a motion vector of each of the block data. The motion vector of the image data for each frame as a whole can be obtained by, for example, taking an average of the motion vectors that are obtained for individual pieces of block data.

The acceleration sensor 110 detects an acceleration generated in the camera 100 as a change in a posture of the camera 100. Although the detail will be described later, the acceleration sensor 110 includes an acceleration sensor that detects an acceleration in a Y-axis direction which is a direction parallel to a horizontal direction of a screen of the liquid crystal display monitor 106 when the photographer holds the camera 100 in front, and an acceleration sensor that detects an acceleration in a Z-axis direction which is a direction parallel to a vertical direction of the screen of the liquid crystal display monitor 106 when the photographer holds the camera 100 in front. It is not always necessary to use the acceleration sensor to detect the change in posture of the camera 100. For example, an angular velocity sensor may be used.

The operation unit 111 includes operation members for the photographer to make various types of operation of the camera 100. The operation unit 111 according to this embodiment at least includes an operation part for instructing a start and end of photography, an operation part for instructing a start and end of reproduction, and an operation part for instructing zoom driving (in a zoom-in direction or a zoom-out direction). The operation unit 111 may include, in addition to this, an operation part for setting an operation mode of the camera 100, an operation part for switching power of the camera 100 on and off, or the like.

The microcomputer 112 centrally controls various sequences of the digital camera 100. When any of the operation parts of the operation unit 111 is operated, the microcomputer 112 controls each block illustrated in FIG. 1 in a manner to correspond to the operation. In addition, the microcomputer 112 includes a function as a scene finalization determination unit. Specifically, the microcomputer 112 determines whether the imaging scene is finalized by the photographer based on the motion vector detected by the motion vector detection circuit 109, an output signal of the acceleration sensor 110, the driving speed (zoom speed) of the zoom lens 101. For example, in one example embodiment, the scene finalization determination unit determines that the imaging scene is finalized if a motion amount of the image pickup apparatus is less than a predetermined amount. As another example, the scene finalization determination unit determines that the imaging scene is finalized if a speed of change of the field angle less than a predetermined amount. As yet another example, the scene finalization determination unit determines that the imaging scene is finalized if a speed of change of the field angle is a constant amount that is less than a predetermined amount. As still another example, the scene finalization determination unit determines that the imaging scene is finalized if a direction of a speed of a change of the field angle caused by the field angle change unit is in a zoom-in direction in which a size of the subject is enlarged with respect to the field angle, and at the same time the speed of the change is a constant amount which is less than a predetermined amount excluding zero. As yet still another example, the scene finalization determination unit determines that the imaging scene is finalized if a motion amount of the image pickup apparatus is within a predetermined range. Further, microcomputer 112 also includes a function as a derivation unit of the image adjustment parameter. Specifically, the microcomputer 112 derives the image adjustment parameter used for image processing in the image processing circuit 105 based on various conditions. The function as the image adjustment processing unit is realized by the microcomputer 112 and the image processing circuit 105.

FIG. 3 is a block diagram illustrating an internal configuration of the image processing circuit 105. The image processing circuit 105 illustrated in FIG. 3 includes a noise reduction processing unit 201, a white balance processing unit 202, a demosaic processing unit 203, a color conversion processing unit 204, a gradation conversion processing unit 205, an edge enhancement processing unit 206, a compression processing unit 207, and a decompression processing unit 208.

The noise reduction processing unit 201 reads image data (Bayer data) that is fed out from the analog-to-digital conversion circuit 103 and stored in the RAM 104, and performs noise reduction processing for removing a high-frequency noise or the like on the Bayer data thus read. The white balance processing unit 202 performs white balance processing for correcting a color balance on the Bayer data that has been processed by the noise reduction processing unit 201.

The demosaic processing unit 203 converts the Bayer data fed out from the white balance processing unit 202 into YC data. The demosaic processing unit 203 performs demosaic processing. The demosaic processing is processing that performs interpolation processing on the Bayer data whose pixel has any of RGB color components and thereby converts the Bayer data into image data (RGB data) whose pixel has three color components, i.e., RGB. After the demosaic processing, the demosaic processing unit 203 performs a predetermined matrix calculation on the RGB data to convert the RGB data into luminance and color difference (YC) data. The conversion into the YC data may be performed prior to the compression processing by the compression processing unit 207.

The color conversion processing unit 204 performs color conversion processing on the YC data obtained by the demosaic processing unit 203. The color conversion processing is a process for applying a predetermined matrix calculation on the YC data to thereby map the YC data in a desired color space. Further, the color conversion processing unit 204 adjusts a saturation and a hue of an image by multiplying the color difference (C) data in the YC data that has been subjected to the color conversion processing by a saturation correction coefficient and a hue correction coefficient that are instructed by the microcomputer 112.

The gradation conversion processing unit 205 performs gradation conversion processing on the luminance (Y) data in the YC data fed out from the color conversion processing unit 204. The gradation conversion processing is a process for correcting the gradation of an image by converting the Y data using a gradation conversion table instructed by the microcomputer 112.

The edge enhancement processing unit 206 performs edge enhancement processing on the luminance (Y) data in the YC data fed out from the gradation conversion processing unit 205, and stores the YC data after the edge enhancement processing into the RAM 104. The edge enhancement processing is a process for emphasizing brightness of an edge component in an image by multiplying the Y data by an edge enhancement coefficient instructed by the microcomputer 112.

The compression processing unit 207 performs compression processing on the YC data that is processed by the edge enhancement processing unit 206 and stored in the RAM 104. In addition, the compression processing unit 207 stores image data (compressed image data) resulted from the compression processing into the RAM 104. Here, the compression processing unit 207 compresses the YC data by using, for example, a well known JPEG method when a still image is captured. Further, the compression processing unit 207 compresses the YC data by using, for example, a well known MPEG method when a moving image is captured.

The decompression processing unit 208 reads an image file stored in the recording medium 108, and decompresses compressed image data included in the image file. Then, the decompression processing unit 208 stores image data (YC data) resulted from the decompression processing into the RAM 104. Here, the decompression processing unit 208 decompresses compressed data by using the JPEG method when the compressed image data is compressed by the JPEG method. Further, the decompression processing unit 208 decompresses compressed image data by using the MPEG method when the compressed image data is compressed by the MPEG method.

Hereinafter, operation of the camera 100 will be described. FIG. 4 is flowchart illustrating a procedure of a photographing sequence by the camera 100. FIG. 4 illustrates mainly a procedure when a moving image is captured. Although it is not illustrated in FIG. 4, the photographer can provide instructions for zoom driving or the like prior to or during the photographing sequence. In addition, an exposure condition or the like for the image pickup unit 102 is derived prior to the photographing sequence.

When a start of photography is instructed by the photographer by operating the operation unit 111, a process illustrated in FIG. 4 starts. Upon receiving the instructions to start photography, the microcomputer 112 performs image pickup process using the image pickup unit 102 and the analog-to-digital conversion circuit 103 (step S1). In this image pickup process, the microcomputer 112 operates the image pickup unit 102 and the analog-to-digital conversion circuit 103 according to the exposure condition that has been derived in advance. Upon receiving the instructions, the image pickup element of the image pickup unit 102 captures an image of a subject and obtains an image signal corresponding to the subject. Then, the analog signal processing circuit performs the analog signal processing on the image signal from the image pickup element. Further, the analog-to-digital conversion circuit converts the image signal that has undergone the analog signal processing into image data (Bayer data) as digital data.

After the image pickup process, the microcomputer 112 uses the image processing circuit 105 and performs image processing on the Bayer data that is stored in the RAM 104 as a result of the image pickup process (step S2). Here, as the image adjustment parameter, a standard image adjustment parameter is used. The standard image adjustment parameter includes such a parameter, for example, stored in the microcomputer 112 in advance, or a parameter that is derived according to a condition independent of an imaging scene. In the image processing in step S2, the microcomputer 112 instructs the start of the image processing by feeding a standard image adjustment parameter into the image processing circuit 105.

After the standard image processing, the microcomputer 112 uses the liquid crystal display monitor 106 to perform display processing (step S3). In this display processing, the microcomputer 112 reads the image data (YC data) that has undergone the edge enhancement processing from the RAM 104, and inputs the YC data thus read into the liquid crystal display monitor 106. The liquid crystal display monitor 106 displays thereon an image corresponding to the input YC data.

After the display processing, the microcomputer 112 uses the image processing circuit 105 to perform compression processing (step S4). In this compression pressing, the microcomputer 112 instructs the image processing circuit 105 to perform the compression processing. Upon receiving the instructions, the compression processing unit 207 of the image processing circuit 105 reads image data (YC data) that has undergone the edge enhancement processing from the RAM 104, and compresses the YC data thus read using the MPEG method.

After the compression processing, the microcomputer 112 detects an acceleration generated in the camera 100 from an output signal of the acceleration sensor 110 (step S5). Subsequently, the microcomputer 112 detects a zoom speed (direction and magnitude) of the zoom lens 101 (step S6). Here, the zoom speed refers to a zoom driving amount per unit time. The zoom speed can be detected by, for example, providing an encoder near the zoom lens 101.

Subsequently, the microcomputer 112 determines whether the imaging scene has been finalized or not by the photographer (step S7). The detail of a determination method for determining finalization of the imaging scene in step S7 will be described later. In the determination in step S7, in the case where the imaging scene is not finalized, the microcomputer 112 performs a process of step S1 and thereafter. Compressed data that has not undergone the image adjustment processing is sequentially stored in the RAM 104 until the imaging scene is finalized.

In contrast, in the case where the imaging scene is finalized by the determination in step S7, the microcomputer 112 performs the image adjustment processing (step S8). The details of the image adjustment processing will be described later.

After the image adjustment processing, the microcomputer 112 determines whether the photography is completed or not through the operation on the operation unit 111 by the photographer (step S9). In the case where the instructions to end the photography are not made in the determination in step S9, the microcomputer 112 performs processes of step S1 and onward. In contrast, in the case where the instructions to end the photography are made in the determination in step S9, the microcomputer 112 stores the compressed data stored in the RAM 104 into the recording medium 108 as a single image file, and thereafter ends the process illustrated in FIG. 4.

Next, a description will be given of the determination of finalizing the imaging scene in step S7. As described above, in this embodiment, the determination whether the imaging scene is finalized is made based on a combination of three conditions including (1) a temporal change of image data, (2) a temporal change of a posture of the camera 100, and (3) a temporal change of a field angle.

First, as a first imaging scene finalization determination, it is determined whether the movement of the camera 100 is small and the temporal change of the field angle is small. This determination determines a state in which the photographer has hardly changed the imaging composition.

The magnitude of the movement of the camera 100 is determined by the temporal change of the image data and the change of the posture of the camera 100. This means that, if the movement of the camera 100 is small, it is deemed that the camera 100 is fixed by the photographer. In this case, it is assumed that the imaging scene is basically finalized.

An entire motion vector quantity (magnitude of the motion vector) of the image data which is detected by the motion vector detection circuit 109 is used for determining whether the imaging scene is finalized which uses the temporal change of the image data. FIG. 5 is a diagram illustrating an example of how finalization of an imaging scene is determined using a motion vector quantity as a first imaging scene finalization determination. As illustrated in FIG. 5, a threshold Thrs M is set to the motion vector quantity to make the determination.

An output signal of the acceleration sensor 110 is used for determining whether the imaging scene is finalized which uses the temporal change of the posture of the camera 100. As in the case of the temporal change of the image data, it is also possible to determine whether the photographer moves the camera 100 by a large amount from the output signal of the acceleration sensor 110. FIG. 6A is a diagram illustrating an example of how finalization of an imaging scene is determined using an output of the acceleration sensor as a first imaging scene finalization determination. In addition, FIG. 6B is a diagram illustrating a relation between a posture of the camera 100 and a direction of a detection axis of the acceleration sensor. As illustrated in FIG. 6A, a threshold Thrs A is set to the output of the acceleration sensor to make the determination. In FIG. 6A, although a size of the threshold of the output of the acceleration sensor in the Y-axis direction is made equal to the size of threshold of the output of the acceleration sensor in the Z-axis direction, these sizes of thresholds may be made different from each other.

Next, whether the temporal change of the field angle is small or not is determined based on the zoom speed. A smaller zoom speed is deemed to indicate that the photographer has not intentionally changed the field angle.

Figure 7:
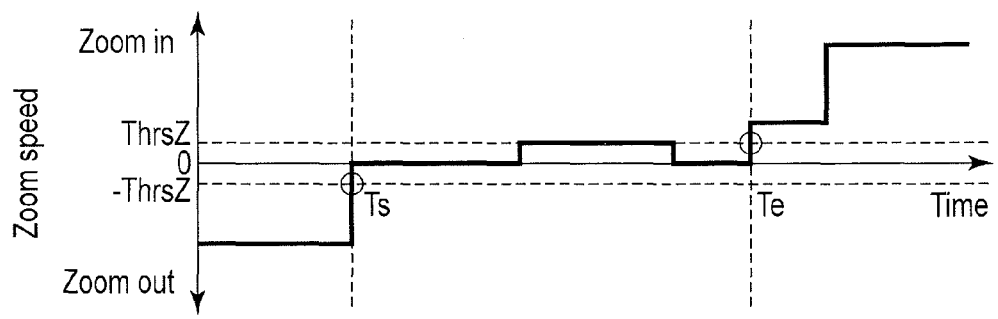
FIG. 7 is a diagram illustrating an example of how finalization of an imaging scene is determined using a zoom speed as the first imaging scene finalization determination.

FIG. 7 is a diagram illustrating an example of how finalization of an imaging scene is determined using a zoom speed as the first imaging scene finalization determination. Here, a zoom-in direction illustrated in FIG. 7 means a direction in which the subject is enlarged with respect to the field angle, i.e., zoom driving in a telephoto direction. In contrast, a zoom-out direction means zoom driving in a wide angle direction. Further, in FIG. 7, the zoom-in direction is a positive direction of the zoom speed. As illustrated in FIG. 7, two thresholds −Thrs Z and Thrs Z are determined based on the reference at which the zoom speed is zero (a state in which the zoom drive is not performed) to make determination.

As illustrated in FIGS. 5 to 7, it is determined that the imaging scene is finalized, when the motion vector quantity becomes less than or equal to threshold Thrs M, or the output of the acceleration sensor becomes less than or equal to threshold Thrs A, and at the same time the zoom speed is within a range between −Thrs Z and Thrs Z. FIGS. 5 to 7 illustrate a time Ts at which the imaging scene is determined as being finalized. In contrast, it is determined that the imaging scene is not finalized, when the motion vector quantity becomes greater than threshold Thrs M, the output of the acceleration sensor becomes greater than threshold Thrs A, or the zoom speed is out of the range between −Thrs Z and Thrs Z. Further, if it is determined that the imaging scene is not finalized in determining whether the imaging scene is finalized or not which is made subsequent to the determination that the imaging scene has been finalized, then it is determined that the imaging scene has changed. FIGS. 5 to 7 illustrate a time Te at which the imaging scene is determined to as having been changed.

As the second imaging scene finalization determination, it is determined whether a movement of the camera 100 is small, and at the same time a temporal change of the field angle is constant at a small value. In the second imaging scene finalization determination, the photographing operation is determined while the zoom is being driven. In other words, determining whether the temporal change of the field angle is constant or not is equivalent to determining whether the photographer has an intention to perform the photographing operation while performing the zoom driving.

Figure 8:
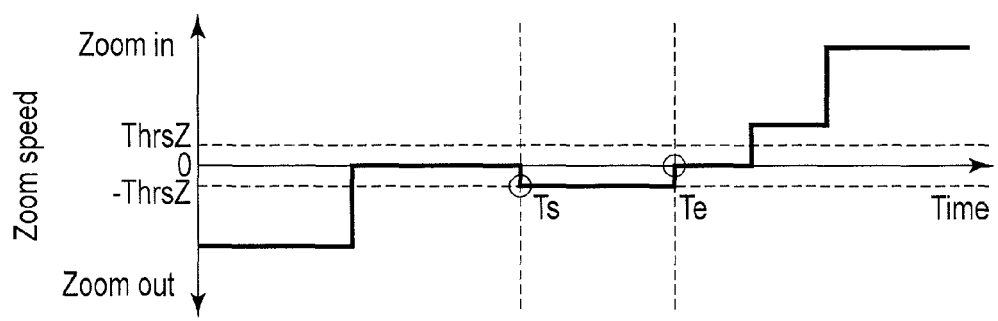
FIG. 8 is a diagram illustrating an example of how finalization of an imaging scene is determined using a zoom speed as a second imaging scene finalization determination.

The magnitude of the movement of the camera 100 is determined by the method illustrated in FIGS. 5, 6A, and 6B. FIG. 8 is a diagram illustrating an example of how finalization of an imaging scene is determined using a zoom speed as a second imaging scene finalization determination. In FIG. 8, two thresholds −Thrs Z and Thrs Z are also determined based on the reference at which the zoom speed is zero to make determination as in the case illustrated in FIG. 7.

As illustrated in FIGS. 5, 6A, 6B, and 8, it is determined that the imaging scene is finalized, when the motion vector quantity becomes less than or equal to threshold Thrs M, or the output of the acceleration sensor becomes less than or equal to threshold Thrs A, and at the same time the zoom speed is constant but not zero within the range between −Thrs Z and Thrs Z. In the second imaging scene finalization determination, since the zoom driving is performed, the field angle (imaging composition) changes with time. However, even in this case, when the zoom speed is relatively small, it is possible that the photographer intentionally changes the field angle, and therefore it is determined that "the imaging scene is finalized". In contrast, it is determined that the imaging scene is not finalized, when the motion vector quantity becomes greater than threshold Thrs M, the output of the acceleration sensor becomes greater than threshold Thrs A, or the zoom speed is out of the range between −Thrs Z and Thrs Z or is not constant. Further, if it is determined that the imaging scene is not finalized in determining whether the imaging scene is finalized or not which is made subsequent to the determination that the imaging scene has been finalized, then it is determined that the imaging scene has changed.

As the third imaging scene finalization determination, it is determined whether a movement of the camera 100 is small, and at the same time temporal change in the field angle is small and a direction of a change (a driving direction of the zoom lens 101) in the field angle is a zoom-in direction. In the third imaging scene finalization determination, the photographing operation is determined while the zoom is being driven as in the case of the second imaging scene finalization determination. However, in the third imaging scene finalization determination, it is also determined whether the photographer intends to photograph an image by concentrating on a main subject by determining whether the direction of a change in the field angle is a zoom-in direction or not.

Figure 9:
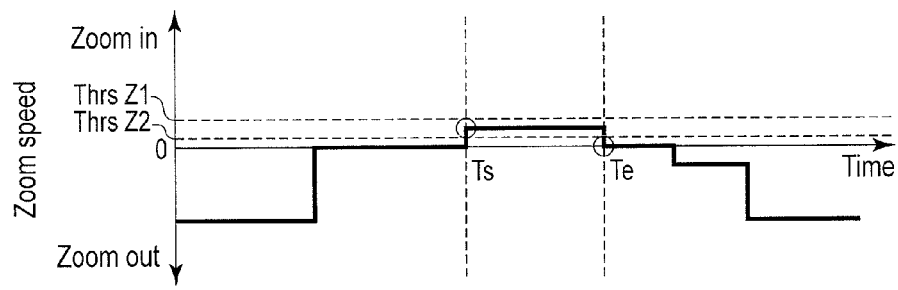
FIG. 9 is a diagram illustrating an example of how finalization of an imaging scene is determined using a zoom speed as a third imaging scene finalization determination.

The magnitude of the movement of the camera 100 is determined by the method illustrated in FIGS. 5, 6A, and 6B. FIG. 9 is a diagram illustrating an example of how finalization of an imaging scene is determined using a zoom speed as the third imaging scene finalization determination. In FIG. 9, two thresholds Thrs Z1 and Thrs Z2 (where Thrs Z2<Thrs Z1) are specified in the zoom-in direction for making determination.

As illustrated in FIGS. 5, 6A, 6B and 9, it is determined that the imaging scene is finalized, when the motion vector quantity becomes less than or equal to threshold Thrs M, or the output of the acceleration sensor becomes less than or equal to threshold Thrs A, and at the same time the zoom speed is within a range between Thrs Z2 and Thrs Z1. Although the zoom speed is constant in the example illustrated in FIG. 9, the zoom speed may not be constant, which is different from the second imaging scene finalization determination. In this third imaging scene finalization determination, since the zoom driving is performed in the zoom-in direction, it is possible that the photographer changes the field angle with an intention to further emphasize the main subject as compared with the case of the second imaging scene finalization determination. In contrast, it is determined that the imaging scene is not finalized, when the motion vector quantity becomes greater than threshold Thrs M, the output of the acceleration sensor becomes greater than threshold Thrs A, or the zoom speed is out of the range between Thrs Z2 and Thrs Z1. Further, if it is determined that the imaging scene is not finalized in determining whether the imaging scene is finalized or not which is made subsequent to the determination that the imaging scene has been finalized, then it is determined that the imaging scene has changed.

According to the first to third imaging scene finalization determinations, the small movement of the camera 100 is made as a reference for determining the finalization of the imaging scene. In contrast, there is a case where there exists an imaging scene that the photographer intends to photograph an image thereof even if there is a movement of the camera 100. An example of this is panning. The panning is operation of the camera 100 to be moved in a fixed direction to capture an image. In the fourth imaging scene finalization determination, a case such as the panning is determined. As the fourth imaging scene finalization determination, it is determined whether an amount of change in posture of the camera 100 is small and a direction of change in posture is a fixed direction or not.

Figure 10:
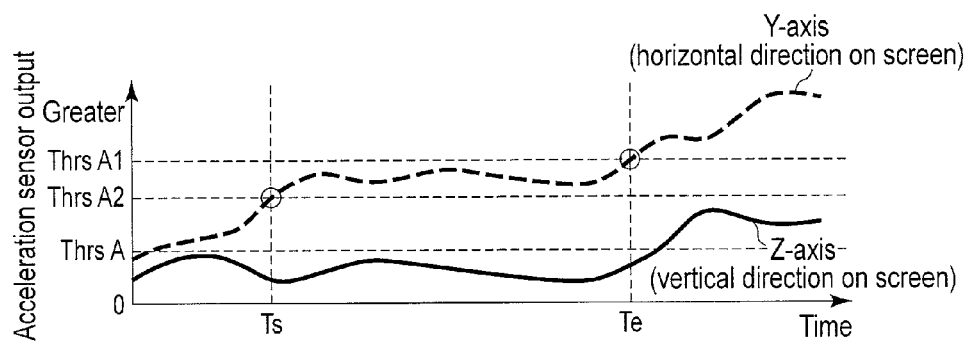
FIG. 10 is a diagram illustrating an example of how finalization of an imaging scene is determined using an output of an acceleration sensor as a fourth imaging scene finalization determination.

FIG. 10 is a diagram illustrating an example of how finalization of an imaging scene is determined using an output of an acceleration sensor as the fourth imaging scene finalization determination. As illustrated in FIG. 10, the determination is made by setting two thresholds Thrs A1 and Thrs A2 (where Thrs A<Thrs A2<Thrs A1) to the output of the acceleration sensor.

As illustrated in FIG. 10, it is determined that the imaging scene is finalized, when the output of the acceleration sensor is within a range between Thrs A2 and Thrs A1. With this fourth imaging scene finalization determination, it is possible to determine the case of panning or the like. In contrast, it is determined that the imaging scene is not finalized when the output of the acceleration sensor is out of the range between Thrs A2 and Thrs A1. Further, if it is determined that the imaging scene is not finalized in determining whether the imaging scene is finalized or not which is made subsequent to the determination that the imaging scene has been finalized, then it is determined that the imaging scene has changed.

In the imaging scene finalization determination, it is determined which one of the first to fourth imaging scene finalizing determinations the current state corresponds to.

Figure 11:
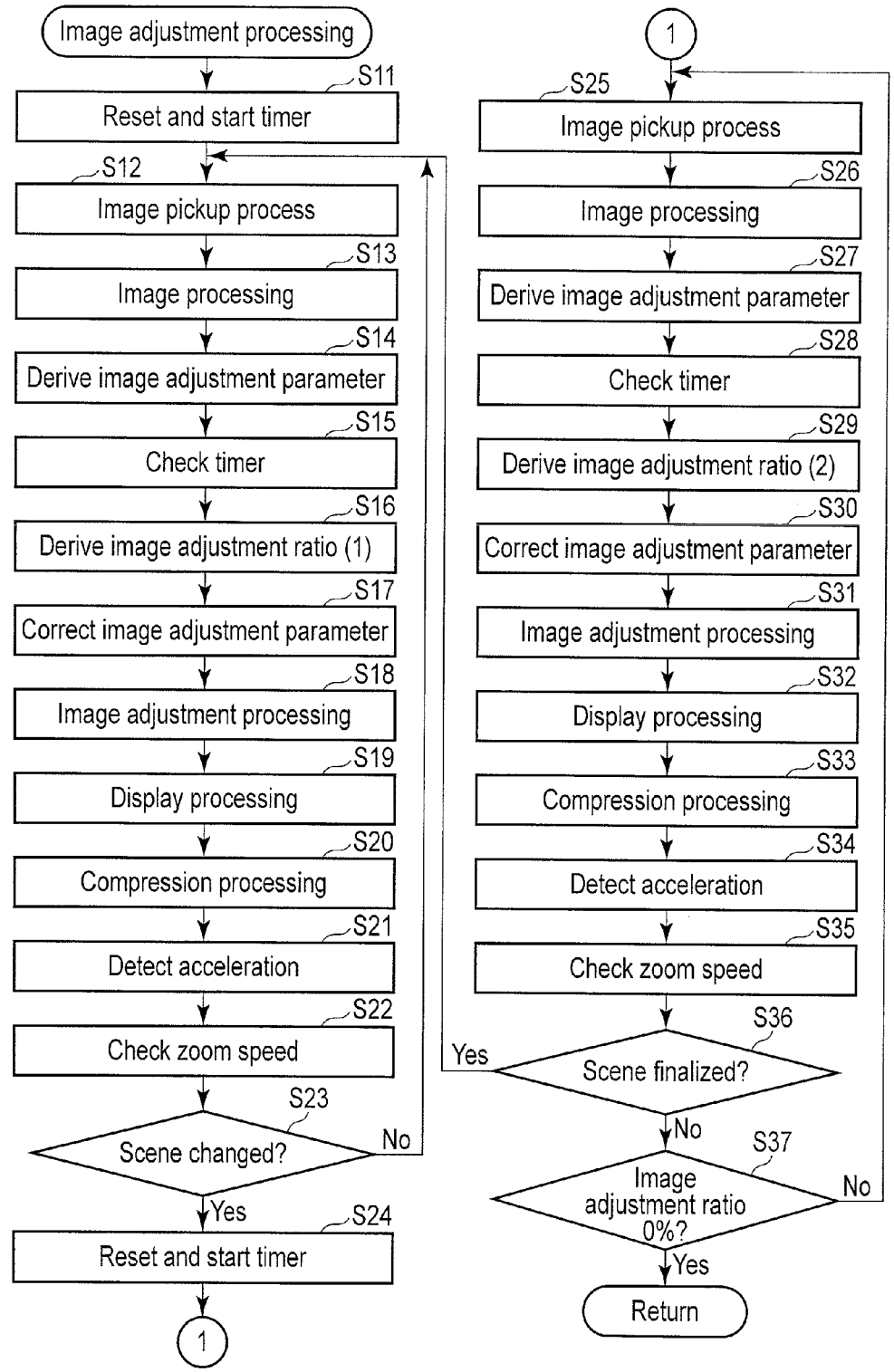
FIG. 11 is a flowchart illustrating a procedure of image adjustment processing.

Next, the image adjustment processing will be described. FIG. 11 is a flowchart illustrating a procedure of image adjustment processing. In the case where the imaging scene is determined as being finalized in the determination process in step S7, the microcomputer 112 resets and starts a timer incorporated therein (step S11). Thereafter, the microcomputer 112 performs the image pickup process by using the image pickup unit 102 and the analog-to-digital conversion circuit 103 (step S12). The exposure condition during this step is, for example, identical with the exposure condition as in the case of step S1.

After the image pickup process, the microcomputer 112 uses the image processing circuit 105 to perform image processing on the Bayer data stored in the RAM 104 as a result of the image pickup process (step S13). The image adjustment parameter to be used here is a standard image adjustment parameter.

After the standard image processing, the microcomputer 112 derives an image adjustment parameter P1 for image adjustment processing by using the image data (YC data) that has undergone the standard image processing (step S14). A well known method can be used as a derivation method for deriving the image adjustment parameter. For example, a luminance histogram, a saturation histogram, and a hue histogram are individually derived from the YC data that has been obtained as a result of the standard image processing. An imaging scene and a main subject of the image data are analyzed. The image adjustment parameter by which a visual effect in accordance with the analyzed imaging scene is obtained is derived. According to the example illustrated in FIG. 3, a saturation correction coefficient, a hue correction coefficient, a gradation conversion table, and an edge enhancement coefficient are derived as the image adjustment parameter. However, other image adjustment parameters may be derived according to the configuration of the image processing circuit 105. It is also possible to change the image adjustment parameters depending on which one of the first to fourth imaging scene finalization determinations is used to finalize the imaging scene.

After the image adjustment parameter P1 is derived, the microcomputer 112 checks a timer value and puts itself on standby until the timer value reaches a predetermined time LT (step S15). After the timer value reaches the predetermined time LT, the microcomputer 112 derives an image adjustment ratio R1 (step S16). After the image adjustment ratio R1 is derived, the microcomputer 112 multiplies the image adjustment parameter P1 that is derived in step S14 by the image adjustment ratio R1 that is derived in step S16 to thereby correct the image adjustment parameter P1 (step S17). Thereafter, the microcomputer 112 uses the image processing circuit 105 to perform image processing (image adjustment processing) again on the image data (YC data) obtained in step S13 (step S18). An image adjustment processing parameter used in this case is an image adjustment parameter P1' (where P1'=P1×R1) that has been subjected to the correction in step S17.

Figure 12:
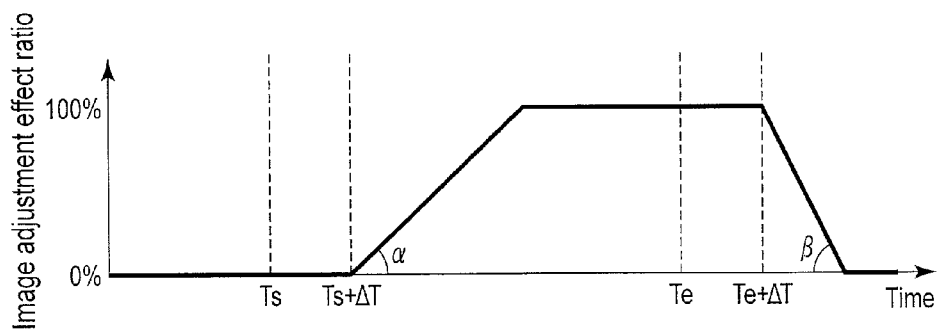
FIG. 12 is a diagram for explaining the image adjustment processing.

FIG. 12 is a diagram for explaining the image adjustment processing. As illustrated in FIG. 12, the image adjustment processing after the imaging scene has been finalized is performed from a time Ts+ΔT at which the predetermined time ΔT elapses since time Ts at which the imaging scene was finalized. In this image adjustment processing, the image processing is repeated while an effect of the image adjustment processing (i.e., image adjustment parameter) is sequentially increased from 0 to 100% for a certain period from time Ts+ΔT. By performing this kind of image adjustment processing, a visual effect, in which the image subjected to the processing with a standard image adjustment parameter gradually becomes an image suitable for the imaging scene, can be obtained. To perform this kind of processing, the microcomputer 112 derives a time T1 (where T1=P1/α) by which a ratio of the image adjustment parameter P1 derived in step S14 to time T1 is made as a predetermined value α of a decreasing speed of the image processing parameter. Subsequently, time T1 is divided into M (M is an integer greater than or equal to 2) equal parts. When a number of processing times of the image adjustment processing after the imaging scene is finalized is set to a number of processing times m (where m is a natural number satisfying 1≤m≤M), the image adjustment ratio R1 is expressed by R1=(m/M) %. For example, when M is 10, the image adjustment parameter is increased by 10% for each image processing. After time T1 elapses and the image adjustment parameter becomes 100%, the image adjustment processing is repeated with the image adjustment parameter of 100% (i.e., with the image adjustment parameter derived in step S14).

After the image adjustment processing, the microcomputer 112 uses the liquid crystal display monitor 106 to perform display processing (step S19). After the display processing, the microcomputer 112 uses the image processing circuit 105 to perform compression processing (step S20).

After the compression processing, the microcomputer 112 detects an acceleration generated in the camera 100 from an output signal of the acceleration sensor 110 (step S21). Subsequently, the microcomputer 112 detects a zoom speed (direction and magnitude) of the zoom lens 101 (step S22).

Subsequently, the microcomputer 112 determines whether the imaging scene has been changed by the photographer (step S23). The method of determining whether the imaging scene has been changed or not was previously described and the description thereof will not be repeated. In the determination in step S23, if the imaging scene has not been changed, the microcomputer 112 performs processes of step S12 and thereafter. This means that the compressed data on which the image adjustment processing has been preformed is sequentially stored in the RAM 104 until the imaging scene is changed. Here, in the second image adjustment processing and thereafter, the time counted by the timer is not ΔT but is T1/M.

Contrary, if the imaging scene has been changed in the determination in step S23, the microcomputer 112 resets and starts the timer incorporated therein (step S24). Thereafter, the microcomputer 112 uses the image pickup unit 102 and the analog-to-digital conversion circuit 103 to perform the image pickup process (step S25). The exposure condition in this case is, for example, the same as the exposure condition in step S1.

After the image pickup process, the microcomputer 112 uses the image processing circuit 105 to perform image processing on the Bayer data stored in the RAM 104 as a result of the image pickup process (step S26). The image adjustment parameter to be used here is the standard image adjustment parameter.

After the standard image processing, the microcomputer 112 derives an image adjustment parameter P2 for image adjustment processing by using the image data (YC data) that has undergone the standard image processing (step S27). A well known method can be used as a derivation method for deriving the image adjustment parameter as in the case of the image adjustment parameter P1.

After the image adjustment parameter P2 is derived, the microcomputer 112 checks the timer value and puts itself on standby until the timer value reaches the predetermined time ΔT (step S28). Here, although the microcomputer 112 puts itself on standby for the same period of time as in the case of step S15, the standby time may be set differently from that in step S15. After the timer values reaches the predetermined time ΔT, the microcomputer 112 derives an image adjustment ratio R2 (step S29). After the image adjustment ratio R2 is derived, the microcomputer 112 multiplies the image adjustment parameter P2 that is derived in step S27 by the image adjustment ratio R2 that is derived in step S29 to thereby correct the image adjustment parameter P2 (step S30). Thereafter, the microcomputer 112 uses the image processing circuit 105 to perform image processing (image adjustment processing) again on the image data (YC data) obtained in step S26 (step S31). An image adjustment processing parameter used in this case is an image adjustment parameter P2' (where P2'=P2×R2) that has been subjected to the correction in step S30.

As illustrated in FIG. 12, the image adjustment processing after the imaging scene has been finalized is performed from a time Te+ΔT at which the predetermined time ΔT elapses since time Te at which the imaging scene was finalized. In this image adjustment processing, the image processing is repeated while the image adjustment parameter is sequentially decreased from 100 to 0% for a certain period from time Te+ΔT. By performing this kind of image adjustment processing, a visual effect, in which the image gradually goes back to the image that is subjected to the processing with the standard image adjustment parameter, can be obtained. To perform this kind of processing, the microcomputer 112 derives a time T2 (where T2=P2/β) by which a ratio of the image adjustment parameter P2 derived in step S27 to time T2 is made as a predetermined value β of a decreasing speed of the image processing parameter. Here, α is less than β. When a number of processing times of the image adjustment processing after the imaging scene is finalized is set to a number of processing times n (where n is a natural number satisfying 1≤n≤N), the image adjustment ratio R2 is expressed by R2=(1−(n/N)) %.

After the image adjustment processing, the microcomputer 112 uses the liquid crystal display monitor 106 to perform display processing (step S32). After the display processing, the microcomputer 112 uses the image processing circuit 105 to perform compression processing (step S33).

After the compression processing, the microcomputer 112 detects an acceleration generated in the camera 100 from the output signal of the acceleration sensor 110 (step S34). Subsequently, the microcomputer 112 detects a zoom speed (direction and magnitude) of the zoom lens 101 (step S35).

Subsequently, the microcomputer 112 determines whether the imaging scene has been finalized by the photographer (step S36). The method of determining whether the imaging scene has been finalized or not was previously described and the description thereof will not be repeated. In the determination in step S36, if the imaging scene has finalized, the microcomputer 112 performs processes of step S12 and onward. This means that, if the imaging scene is finalized again, the image adjustment processing after the finalization of the imaging scene is performed again. On the other hand, if the imaging scene has not been finalized in the determination in step S36, the microcomputer 112 determines whether the image adjustment ratio R2 becomes 0% or not (step S37). If the image adjustment ratio R2 does not become 0% in the determination in step S37, the microcomputer 112 performs processes of step S25 and onward. Specifically, the compressed data that has undergone the image adjustment processing is sequentially stored in the RAM 104 until the image adjustment ratio returns to 0%. Here, in the second image adjustment processing and thereafter, the time counted by the timer is not ΔT but is T2/N. Further, if the image adjustment ratio R2 becomes 0% in the determination in step S37, the microcomputer 112 ends the process illustrated in FIG. 11 and returns to the process illustrated in FIG. 9 and onward.

As described above, according to this embodiment, it is determined whether the photographer has intentionally finalized the imaging scene or not, and, if it is determined that the photographer has intentionally finalized the imaging scene, image adjustment processing according to the imaging scene at that time is performed. With this arrangement, it is possible to automatically perform image adjustment processing intended by the photographer even during the capture of moving images. In that case, since the image adjustment processing is performed by gradually increasing the image adjustment parameter, it is possible to suppress a quick application of the image adjustment processing. It is also possible to provide a visual effect in which the image gradually turns into an image according to the imaging scene.

In addition, if the imaging scene is changed, the image adjustment processing that has been performed is halted, and thereafter the image adjustment processing is performed by gradually decreasing the image adjustment parameter. Therefore, it is possible to suppress a quick application of the image adjustment processing. It is also possible to provide a visual effect in which the image gradually returns to an original image.

Further, according to this embodiment, the image adjustment processing is performed not immediately after the imaging scene has been finalized but after a lapse of a certain time ΔT. With this arrangement, it is possible to exclude a case in which the imaging scene has been accidentally finalized, and further reduce a possibility in which the image adjustment processing which is not intended by a photographer is performed.

The foregoing embodiment mainly indicates a procedure when the moving images are captured. When a still image is captured, image adjustment processing according to the imaging scene may be directly performed without determining whether the imaging scene has been finalized or not.

Further, according to the foregoing examples, the temporal change of the field angle is determined from the zoom speed. Also, in the case where, for example, a photographer holding the camera 100 approaches a subject, an effect similar to the effect in which the zoom lens 101 is driven in a zoom-in direction can be obtained. When an acceleration sensor for detecting an acceleration in an X-axis direction is provided in the camera 100, it is possible to determine, from the acceleration in the X-axis direction, such operation as whether the camera 100 has performed zoom-in operation or not.

According to the foregoing examples, the image adjustment processing is performed on the data that has undergone the standard image processing. However, the two kinds of processing may be combined in one, and the image processing may be performed at once.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus comprising:
   an image pickup unit configured to capture an image of a subject in photographing operation and obtain image data according to the subject;
   a scene finalization determination unit configured to determine whether an imaging scene is finalized by a photographer in the photographing operation; and
   an image adjustment processing unit configured to apply image adjustment processing according to the imaging scene that is finalized to the image data obtained by the image pickup unit if the scene finalization determination unit determines that the imaging scene is finalized,
   wherein the scene finalization determination unit determines that the imaging scene is finalized, and thereafter determines whether the finalized imaging scene changes or not, and
   the image adjustment processing unit gradually increases an effect of the image adjustment processing on the image data as the image adjustment processing to be performed if the scene finalization determination unit determines that the imaging scene is finalized, and gradually decreases an effect of the image adjustment processing on the image data as the image adjustment processing to be performed if the scene finalization determination unit determines that the imaging scene changes.

2. The image pickup apparatus according to claim 1, further comprising a field angle change unit configured to change a field angle in the photographing operation,
   wherein the scene finalization determination unit determines that the imaging scene is finalized if a speed of change of the field angle is less than a predetermined amount.

3. The image pickup apparatus according to claim 1, further comprising a field angle change unit configured to change a field angle in the photographing operation,
   wherein the scene finalization determination unit determines that the imaging scene is finalized if a speed of change of the field angle is a constant amount that is less than a predetermined amount.

4. The image pickup apparatus according to claim 1, further comprising a field angle change unit configured to change a field angle in the photographing operation,
   wherein the scene finalization determination unit determines that the imaging scene is finalized if a direction of a speed of a change of the field angle caused by the field angle change unit is in a zoom-in direction in which a size of the subject is enlarged with respect to the field angle, and at the same time the speed of the change is a constant amount which is less than a predetermined amount excluding zero.

5. The image pickup apparatus according to claim 1, wherein the scene finalization determination unit determines that the imaging scene is finalized if a motion amount of the image pickup apparatus is a constant amount that is less than a predetermined amount and a motion direction is constant.

6. The image pickup apparatus according to claim 1, wherein the image adjustment processing unit sets a value of an increasing speed to gradually increase the effect of the image adjustment processing less than a value of a decreasing speed to gradually decrease the effect of the image adjustment processing.

* * * * *